Patented June 10, 1924.

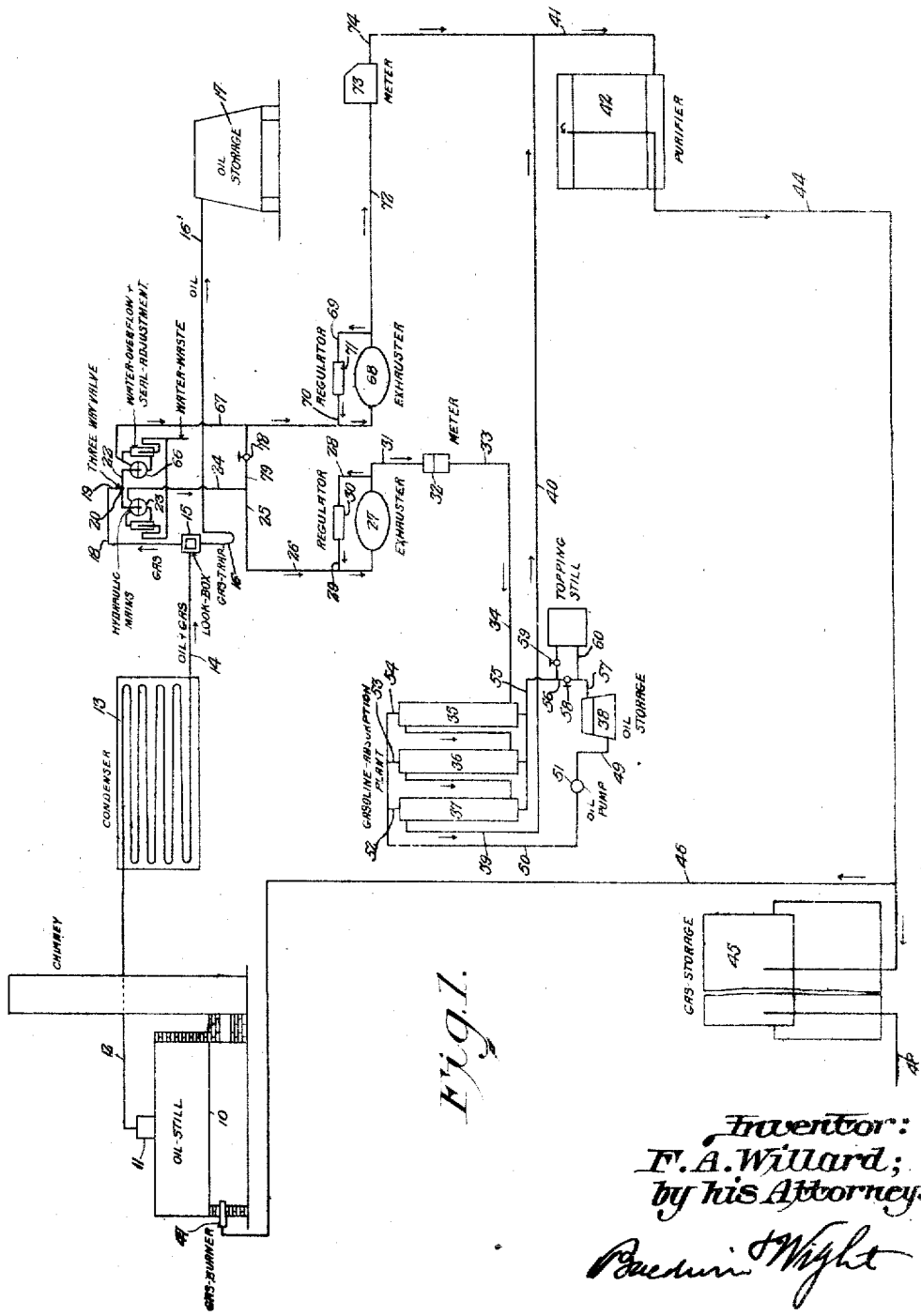

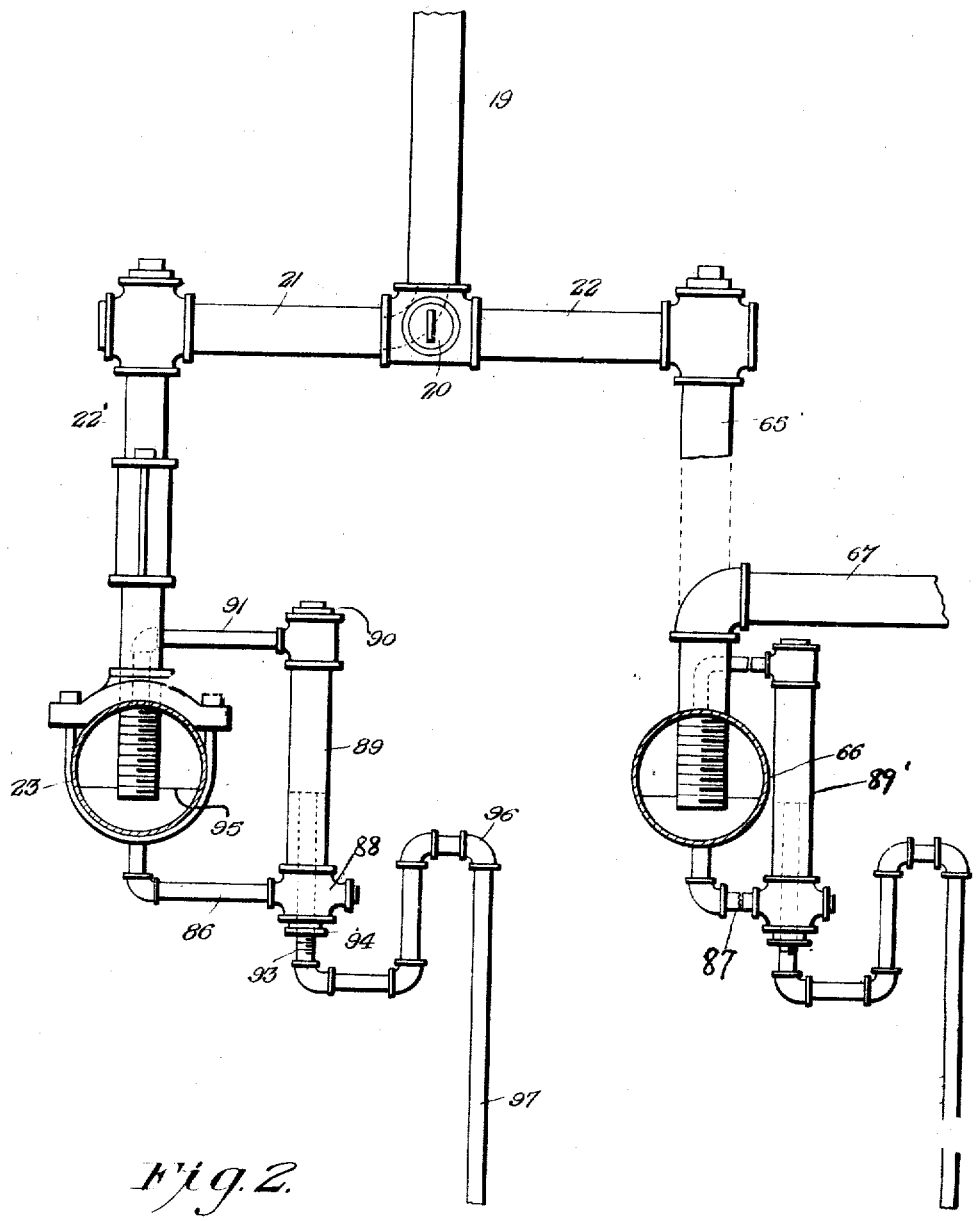

1,497,128

UNITED STATES PATENT OFFICE.

FREDERICK A. WILLARD, OF McALESTER, OKLAHOMA.

APPARATUS FOR THE TREATMENT OF OIL REFINERY GASES.

Application filed December 13, 1920. Serial No. 430,248.

*To all whom it may concern:*

Be it known that I, FREDERICK A. WILLARD, a citizen of the United States of America, residing at McAlester, Oklahoma, have invented certain new and useful Improvements in Apparatus for the Treatment of Oil Refinery Gases, of which the following is a specification.

The present invention relates to the treatment of and recovery of the gases evolved in refining or distilling mineral oil, petroleum and analogous materials, with a view to recovering in a purified condition the entire amount of the combustible gases, and also recovering, if desired, gasoline and like material which, under the present procedure, is largely lost or burned or thrown away. The system herein described is applicable to any of the ordinary distillation operations in which petroleum or certain fractions thereof are distilled and aims to recover all of the useful products.

Referring to the annexed drawing, Fig. 1 is a diagrammatic elevation of an entire system of apparatus for the treatment of petroleum and Fig. 2 is a vertical section of a double hydraulic main device and its accessories and connections.

In Fig. 1, 10 represents an oil still which may be of the barrel type, as shown, provided with a dome 11, in which the vapors and gases evolved in the still collect and these gases and vapors are drawn off through pipe 12 to a suitable condenser, for example a worm condenser shown at 13. 14 represents a pipe through which the mixture of condensate and uncondensed gases and vapors leave the condenser and pass to a "look box" 15. This box constitutes a separator in which the gases and vapors which are uncondensed are drawn off by a slight suction, while the liquid oil passes through the trap 16 and is led by pipe 16' into the oil storage tank 17. The distillate from tank 17, may be carried off and purified in any suitable manner or otherwise treated or sold direct. In the pipe 18 leading upwardly from the look box 15 there is maintained a slight suction representing one or two inches of water. This amount of suction will be, under ordinary conditions, sufficient to cause the vaporization of the very light naphtha or light gasoline fractions which ordinarily are lost in weathering in the oil storage, and in order to accomplish the removal of these light vapors from the distillate, it is customary to allow the distillate to stand exposed to the air for a considerable period amounting in many cases to several weeks. This, of course, greatly adds to the fire risk and also causes the complete loss of the said vapors which are highly valuable if suitably recovered.

The gases and vapors come downwardly through pipe 19 to the valve 20.

As shown in Fig. 2, the valve 20 may connect the pipe 19 either with the pipe 21 or the pipe 22, as desired. When the gases coming through pipes 18 and 19 contain considerable quantities of light gasoline vapor, it is advisable to connect the pipe 19 with the pipe 21 by turning the valve 20 into the position shown in dotted lines in Fig. 2. The gases and vapors then descend through pipe 22', which dips into water in the main 23, the water therein being maintained at a constant level as described below.

The gases and vapors are drawn out from the hydraulic main 23 by the pipe 24 (see Fig. 1), from which they flow by pipes 25 and 26 into an exhauster 27, by means of which a slight suction is maintained from the look box 15 down to the inlet of the exhauster. A by-pass 28—29 is provided, in which there is interposed a regulator 30, so that whenever more than a predetermined excess of pressure exists in the pipe 28 over the amount of pressure in the pipes 26 and 18, gas and vapors can pass through the regulator 30 into the pipe 29.

The gases then flow through pipe 31, gas meter 32, pipes 33 and 34, into a gasoline absorption plant shown diagrammatically as consisting of towers 35, 36, 37, down which oil, such as heavy oil, from the tank 38 may flow. The said heavy oil absorbs almost quantitatively the gasoline vapors and the resulting gases flow off through pipes 39, 40, into gas line 41, from which they pass through a suitable purifier 42, which purifier may contain oxid or hydroxid of iron to remove sulfur and may also contain lime to remove carbon dioxid, the purified gases passing by pipe 44 into a suitable gas holder 45 of any appropriate size. Gas is drawn from this holder or from the pipe 44, through pipe 46 to burner 47 for heating the still and gas may also be drawn from the gasometer 45 through pipe 48, for any other purpose for which it is desired to use the gas. The heavy oil from tank 38 may be pumped up through pipes 49, 50, by pump 51 and by means of branches 52, 53 and 54, this heavy oil may be admitted to the towers 37, 36 and 35, respectively. The heavy oil containing the absorbed gasoline is drawn off by pipe 55 and may pass through pipes 56 and 57 back into the oil storage 38, the valve 58 being open and the valve 59 being closed. If desired, however, the valve 58 may be closed, 59 opened and the oil may pass through a topping still in which the gasoline is driven off and recovered and may then pass through pipe 60, pipe 57, back to the storage tank 38. The topping still may be of any desired construction, either continuous or intermittent and the oil coming from pipe 55 may be run continuously to this still or it may run intermittently through if desired, or in some cases a portion of the oil from pipe 55 may run to the still and another portion to the storage tank, the valves 58 and 59 being adjusted to secure this result.

When the gases coming from the look box 15 do not contain any considerable quantity of gasoline vapor or if it is desired for any reason not to operate the gasoline absorption plant, then the gases may be diverted by valve 20 into the pipe 22, for this purpose the valve 20 being rotated in a clock-wise direction 90 degrees. The gases will then pass down through pipe 65 into the hydraulic main 66, from which they are drawn off through pipe 67 to an exhauster 68 provided with by-pass 69, 70, provided with a regulator 71, all similar to the exhauster 27 and its connections above referred to. The gas passes from the exhauster 68, passes through the pipe 72, meter 73, pipe 74 and into the line 41 above referred to.

In addition to the valve 20 above referred to, another valve 78 may be provided in a by-pass pipe 79, connecting the pipe 24 with the pipe 67, so that the gases from the main 66 may pass through pipe 67, open valve 78, pipe 79, pipe 25, pipe 26 into exhauster 27. In this way provision is made for using either of the two hydraulic mains with either of the two exhausters which feature becomes of importance when some of the apparatus in the plant gets out of order.

Referring now more particularly to Fig. 2, the two hydraulic mains 23 and 66 are each provided with liquid outlet pipes 86 and 87, respectively, the first of these leading into the union 88 located at the bottom of a stand pipe 89 closed at its top by a plug 90 and provided at a point near its top with a by-pass 91 connecting the upper portion of the stand pipe with the upper portion of the interior of the main 23. Liquid such as water is supplied to the hydraulic main 23, preferably as a continuous small stream, and the vertical pipe 93 in the bottom of the stand pipe may be screwed upwardly or downwardly in the union 94 to bring the upper end of the pipe 93 to the desired level, which level will fix the level of the water or other liquid 95 in the hydraulic main 23. The pipe 93 is connected to an inverted U-shape trap 96, the water overflowing by the pipe 97 to waste or elsewhere.

The pipe 87 may connect to a vertical pipe 89', which in turn will be connected at its top to the hydraulic main 66. While in another modification the pipe 87 might connect with the union 88, it is advisable to provide separate stand pipes for the two hydraulic mains in order that a difference in pressure in the two mains can be maintained, which is of importance.

By the water overflow and seal adjustment devices above described, the level of the liquid in the two hydraulic mains can very readily be maintained, and by virtue of the arrangement shown, the waste pipe cannot act as a siphon to draw the liquid in the hydraulic main below the predetermined level.

I claim:

1. A system of apparatus for the recovery of oil still gases and by-products which comprises an oil still, a condenser, a trap adapted to separate the gases from the condensate, connections therebetween, a plurality of hydraulic mains, means for connecting said trap, at will, to either of said mains, a connection from one of said mains to a gasoline absorption apparatus and thence to a gas holder, a separate connection from another main to said gas holder, without passing through a gasoline absorption apparatus, and a regulable gas propelling means located in each of the last-named connections.

2. A system of apparatus for the recovery of oil still gases and by-products which comprises an oil still, a condenser, a trap adapted to separate the gases from the condensate, connections therebetween, two hydraulic mains, a three-way valve for connecting at will either of said mains to said trap, a connection from one main to a gasoline absorption apparatus and thence to a gas holder, a separate connection from the other main to said gas holder and an exhauster in each of the last-named connections.

3. A system of apparatus for the recovery of oil still gases and by-products which comprises an oil still, a condenser, a trap adapted to separate the gases from the condensate, connections therebetween, a plurality of hydraulic mains, means for connecting at will either of said mains to said trap, a line of connections from one of said mains to a gasoline absorption apparatus, a separate line of connections from the other of said mains to a gas holder, an exhauster in each line of connections, and a valve controlled communication between the two lines of connections.

4. A system of apparatus for the recovery of oil still gases and by-products which comprises a trap adapted to receive condensate and gases from the distillation of petroleum material, and adapted to separate the gases and condensate from each other, a plurality of hydraulic mains, means for connecting said trap, at will, to either of said hydraulic mains, a connection from one of said hydraulic mains to a gasoline absorption apparatus and thence to a gas holder, a separate connection from one of said gas mains to said gas holder without passing through a gasoline absorption apparatus and regulable gas propelling means located in each of the last-named connections.

5. A system of apparatus adapted for the recovery of oil still gases and by-products which comprises a trap adapted to receive condensate and gases from the distillation of petroleum material, and adapted to separate the gases from the condensate, and two hydraulic mains, a connection containing a three-way valve for connecting, at will, either of said hydraulic mains to said trap, a connection from one of said hydraulic mains to a gasoline absorption apparatus and thence to a gas holder, a separate connection from the other of said hydraulic mains to said gas holder by-passing said gasoline absorption apparatus, and an exhaust in each one of the last-mentioned connections.

In testimony whereof, I have hereunto subscribed my name.

FREDERICK A. WILLARD.